United States Patent [19]

Karhu

[11] Patent Number: 4,974,408
[45] Date of Patent: Dec. 4, 1990

[54] ALTERNATE REVERSE TWISTING METHOD AND APPARATUS

[75] Inventor: Raimo K. Karhu, Helsinki, Finland
[73] Assignee: Oy Nokia Ab, Helsinki, Finland
[21] Appl. No.: 252,277
[22] PCT Filed: Mar. 30, 1987
[86] PCT No.: PCT/FI87/00043
 § 371 Date: Sep. 27, 1988
 § 102(e) Date: Sep. 27, 1988
[87] PCT Pub. No.: WO87/06050
 PCT Pub. Date: Oct. 8, 1987

[30] Foreign Application Priority Data

Apr. 1, 1986 [FI] Finland .................................. 861374

[51] Int. Cl.$^5$ ............................................ H01B 13/02
[52] U.S. Cl. ........................................... 57/293; 57/9; 57/294; 57/311; 57/314
[58] Field of Search .................... 57/293, 294, 59, 311, 57/314, 6, 7, 9

[56] References Cited

U.S. PATENT DOCUMENTS

| | | | |
|---|---|---|---|
| 3,847,190 | 11/1974 | Forester | 57/293 X |
| 3,910,022 | 10/1975 | Reed | 57/59 X |
| 4,414,802 | 11/1983 | Garner et al. | 57/293 |
| 4,426,838 | 1/1984 | Garner et al. | 57/293 |
| 4,426,839 | 1/1984 | Garner et al. | 57/293 |

FOREIGN PATENT DOCUMENTS

| | | |
|---|---|---|
| 0103963 | 3/1984 | European Pat. Off. . |
| 0104725 | 8/1984 | European Pat. Off. . |
| 1465550 | 1/1969 | Fed. Rep. of Germany . |
| 3227481 | 1/1984 | Fed. Rep. of Germany . |
| 3404264 | 8/1985 | Fed. Rep. of Germany . |
| 803958 | 6/1981 | Finland . |
| 546943 | 3/1977 | U.S.S.R. . |
| 781982 | 12/1980 | U.S.S.R. . |

OTHER PUBLICATIONS

Derwent's Abstract No. J.8082 D/38, SU 781 982–Nov. 23, 1980.

Primary Examiner—John Petrakes
Attorney, Agent, or Firm—McAulay Fisher Nissen & Goldberg

[57] ABSTRACT

An alternate reverse or so-called SZ-twisting method and apparatus and cable product produced by alternate reverse twisting method and/or apparatus. Elements (2) which are to be alternately reversely twisted may be wires, leads, optical fibers, their groups and which can also include quads of wires, leads, optical fibers. Elements (2) to be twisted and a possible core element (9) are drawn from a fixed divider (3), preferably a perforated holeplate, through a twister (6), preferably a perforated holeplate, rotating periodically in opposite directions, to a presser (7), preferably a nipple, in which the elements to be twisted and the possible core element are pressed together, to form an alternately reversely twisted product (8). Between the divider (3) and the twister (6) pipe group (4, 5) is provided for defining the feedpaths of the elements (2) to be twisted and the possible core element (9). The pipe group includes both a centrally located central pipe (5) for defining the feedpath of the possible core element and several peripheral pipes (4) for defining the feedpaths of said elements to be twisted, which peripheral pipes circumferentially surround the central pipe and are periodically twistable in opposite directions around and against the central pipe.

19 Claims, 1 Drawing Sheet

ALTERNATE REVERSE TWISTING METHOD AND APPARATUS

BACKGROUND OF THE INVENTION

This invention relates to alternate reverse or so-called SZ-twisting.

More specifically, the object of the present invention is to provide an alternate reverse twisting method to form a product, such as a cable or similar, composed of an inner core element (9) and/or of alternately reversely twisted elongated elements (2) which can be wires, leads, optical fibers or their groups, or similar or which can be twisted as quads of wires, leads etc., by an alternate reverse twisting apparatus comprising:
- a fixed dividing means (3) at the input end of the elements (2,9) to be treated,
- to opposite directions periodically rotating twisting means (6) at the output end of the treated elements (2,9),
- thereafter arranging pressing means (7), preferably a nipple, for pressing the treated elements (2,9) tightly against each other, and
- means (4,5) for defining feedpaths for the elements (2,9) to be treated, which means are arranged between said dividing and twisting means.

The object of the present invention is also to provide an alternate reverse twisting apparatus to form a product, such as a cable or similar, composed of an inner core element (9) and/or alternately reversely twisted elongated elements (2) which can be wires, leads, optical fibers or their groups or similar or which can be twisted as quads of wires, leads etc. The apparatus comprises different treatment stations from an upstream to a downstream end, as follows:
- a fixed dividing means (3) at a first station forming the input end of the elements (2,9) to be treated at the upstream end of the apparatus,
- at a second station periodically rotating twisting means (6) at the output end of the treated elements (2,9) between the upstream and downstream ends,
- at a third station pressing means (7), preferably a nipple, provided for pressing said treated elements (2,9) tightly against each other at the downstream end and
- means (4,5) for defining feedpaths of said elements (2,9) to be treated, which means are arranged between said dividing and twisting means (3,6).

Further the object of the present invention is the provision of an alternate reversely twisted product, such as an electric and/or optical cable, lead or similar elements.

Elongated elements as leads, wires or similar are conventionally produced in a SZ-twisting apparatus for example by means of a tracked pulling device from input sides for pulling the elongated elements through a first circumferentially perforated holeplate serving as a fixed dividing means and then through to an to an opposite directions by means of a periodically rotating second circumferentially perforated oscillating holeplate for serving as a twisting means and thereafter pulling the elongated elements into a pressing means, preferably a nipple, in which the elements are pressed tightly against each other. Further a spinning device can be used to bind the pressed elements as an alternate reversely twisted product. After completion of the stages using the pulling device, spooling either takes place or the twisted product can be fed to a next work phase. In this kind of a conventional SZ-twisting device it has usually been placed between the dividing and twisting means so that a tubular intermediate element rotating with the twisting means can be centrally fixed to it as well as mounted at its opposite end in bearings to rotate in relation to the dividing means.

This kind of a conventional arrangement includes, however, the disadvantage, that the rotation speed of the intermediate element is always constant, so that twisting turns of elongated elements tends to accumulate to the end towards the twisting means, whereby the pitch of the elongated elements becomes denser and their angular deviation into the twisting means increases. Then between the direction reverse points of the twisting direction the number of helices of the twisted elements is very limited being 10 at the highest, and also the force required for pulling the elements increases whereby the helices of the twisted product tends to open.

This main problem, i.e., an accumulation of the elements to be twisted, a large pulling force and a low number of helices has previously been tried to solve the problems by principally three different methods, however, without finding a satisfactory solution.

Firstly, according to patent publication U.S. Pat. No. 3,910,022 and U.S. Pat. No. 4,414,802 between a fixed dividing holeplate at one end and, at another end downstream of the other end, there is provided a periodically oscillating twisting holeplate for rotating in different directions, and a torsion-elastic torsion pipe is provided wherein the inner space is divided by spacers for keeping the elements to be twisted apart from each other, so that the spacers thus define feedpaths of individual elements to be twisted.

Secondly, according to published FI-patent application No. 803958 and U.S. Pat. No. 4,426,838 between a fixed dividing holeplate and periodically oscillating twisting holeplate which oscillate in opposite directions, there is a torsion-elastic torsion cable, rod or wire, to which several disk-shaped and circumferentially perforated disks are fixed and spaced apart in axial direction, whereby the opening of the perforated disks serve as guide means for individual elements to be twisted.

Thirdly, according to U.S. Pat. No. 4,426,839 and SU Publication No. 546,943 between the fixed dividing holeplate and a periodically oscillating twisting holeplate oscillating in opposite directions there are several separate pipe or spiral means, so that the space inside each individual pipe or spiral means serves as a guide means for individual elements to be twisted. According to said U.S. Pat. No. 4,426,839 the pipe means have been bound together by plates provided with circumferential openings for the pipe means, while according to the SU-publication the spiral means extend freely between dividing and twisting means.

The above-mentioned disadvantage, i.e. accumulation of elements, having a great pulling force, low number of helics and a so-called "skip-rope" phenomenen occuring especially at high rotating speeds a solution has also been tried to solve the problem according to the teachings of U.S. Pat. No. 3,847,190, in which the pipes defining feed-paths of individual elongated elements to be twisted have been arranged inside a larger cylindrical mantle tube and fixed at one of their ends to a fixed dividing holeplate and at their other ends they are fixed to the end flange of said rotating mantle tube.

Disadvantages have also been encountered when trying to solve the problem by using the apparatus according to DE-publication No. 3404264 which is an improved conventional SZ-starnding apparatus which include one rigid central pipe rotating with the twisting means whereby elements to be twisted are wound around the periphery of said central pipe. Attempts have been made to solve the jamming effect problem by accumulation by providing the dividing holeplate with its own rotation drive and by mounting an intermediate circumferentially perforated holeplate in bearings onto the periphery of the central pipe and providing it with its own rotation drive. Thus the axial distance by which the elongated elements are wound around the central pipe can be increased somewhat due to the intermediate plate, but the main problem, i.e. growing friction and low number of helices cannot yet be eliminated.

Though it has been possible by the afore-mentioned solutions to slightly reduce the accumulation tendency of the elements to be twisted as well as the adverse effects of this disadvantage the goal has not yet been achieved in a satisfactory manner. Some of the most substantial disadvantages are set forth below.

When a torsion-elastic pipe, inside of which the elongated elements to be twisted pass, is used between the dividing and twisting means the limited twisting ability of the torsion pipe restricts twisting turns of the pipe and thus also twisting turns of the elements to be twisted, whereby the reverse points in the twisting direction must be placed remarkably close to each other, which is disadvantageous.

When a torsion cable or similar is used between the dividing and twisting means and when said torsion cable is provided with several axially spaced apart perforated disks to guide individual elongated elements, said elongated elements are wound against said torsion cable. Thus it is impossible to eliminate the very remarkable disadvantages, i.e. jamming factor and growing friction when the number of twisting turns in one direction increase over 10. Further can be mentioned that it is impossible to produce by this kind of method or apparatus products requiring the use of a central or "core" element.

When parallel and annularly adapted means, i.e. spirals or pipes, for defining the feedpaths for individual elongated elements are used between the dividing and twisting means it is not possible to apply high rotational speeds for twisting, but because of sag and centrifugal force said means for defining the feedpaths of elements strive to detach and also easily twist unevenly in relation to each other, which significantly impedes easy twisting and increases the probability for producing a cable unfit for its purpose.

SUMMARY OF THE INVENTION

The main object of the present invention is to provide an improved alternate reverse twisting method and apparatus, by which the above mentioned disadvantages related to previously known alternate reverse twisting methods and apparatus could essentially be eliminated.

This object has been achieved by the afore-mentioned alternate reverse twisting method according to the present invention so, that the elongated elements to be twisted are drawn from said dividing means to said pressing means through torsion-elastic peripheral pipes arranged peripherally around a central pipe whereby each individual elongate element to be twisted is adapted to pass inside one of said peripheral pipes, and so that said peripheral pipes are twisted periodically in one direction several turns around and against said central pipe.

The afore stated object has also been achieved by the afore-mentioned alternate reverse twisting apparatus according to the present invention so that said means for defining the feedpaths are support and guide means for said elements to be treated and include essentially a centrally disposed central pipe and periodically to twist in opposite directions twistable peripheral pipes (4) adapted between said dividing and twisting means so that said peripheral pipes are during each twisting stage into one direction against the periphery of said central pipe, and so, that said elements to be twisted are arranged to pass through said peripheral pipes.

The second significant object of the present invention is to produce an essentially new-looking alternate reversely twisted product in which the distance between each reverse point of twisting direction would be essentially longer than one previously has been able even to imagine.

According to the present invention the new-looking alternate reversely twisted product differs from the previously known alternate reversely twisted products, in that the number of twisting turns of the individual peripheral twisted elements of said product between the reverse points of the twisting direction are between 10 to 100, preferably between 30 to 80.

The present invention is based on that ingenious idea that the means adapted between dividing and twisting means are intended both to support every individual element to be twisted and to define a friction-free feedpath for every single element to be passed through the apparatus according the present invention. Due to the present invention it is now possible essentially to increase both the number of twisting turns in both directions and the distance between the reverse points of twisting direction as well as the effective lateral distance by which the periphercal torsion-elastic pipes of the apparatus are wound around the periphery of the central pipe. Thus both the accumulation tendency of the elongated elements towards the twisting means and high friction effect both high pulling force applied to the elongated elements to be twisted can essentially be decreased.

BRIEF DESCRIPTION OF THE DRAWINGS

Preferred embodiments of the present invention will now be descriped by manner of example with reference to accompanying the drawing in which.

DESCRIPTION OF THE PREFERRED EMBODIMENT

Figure 1:
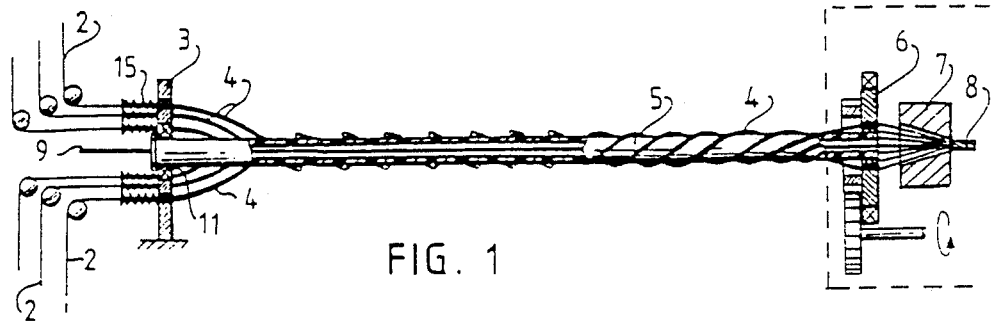
FIG. 1 is a side elevational view partly in cross-section of an alternate reverse twisting apparatus according to the first advantageous embodiment of the present invention.
Figure 4:
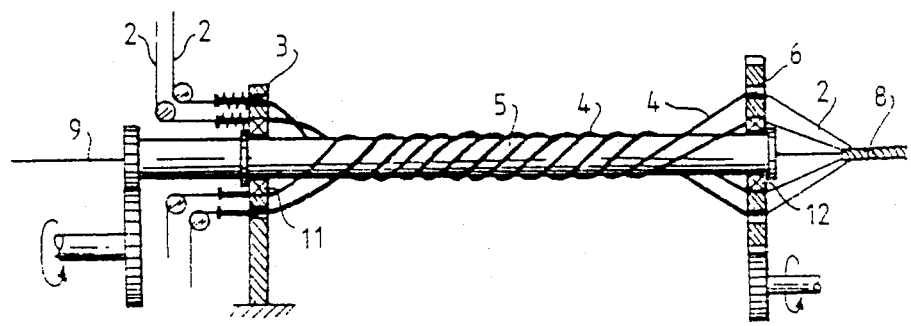
FIG. 4 is a simplified and partly cross-sectional side view of the alternate reverse twisting apparatus according to the second advantageous embodiment of the present invention.

As may be seen from FIGS. 1 or 4 the alternate reverse twisting apparatus, which hereafter is called an "SZ-twisting apparatus", according to the invention includes:

fixed dividing means 3 adapted to the input end of the elements 2 to be twisted, as electric and/or optical wires, leads and fibers, both partial wires or leads and quads as well groups thereof, which hereafter is called "wires" and they are drawn from starting spools and twisted by the SZ-twisting apparatus, periodically rotating the rotable twisting means 6 in opposite directions and adapted to the output end of the wires to be twisted, and support and guide means 4 and 5 arranged between the dividing and twisting means 3 and 6, for defining the feedpaths for the wires 2 to be twisted.

When a SZ-twisted product is being manufactured by the SZ-twisting apparatus according to the invention the wires 2 which are to be twisted and a possible core element 9, which are element can be for instance a cable, electric or optical lead, polypropylene, polystyrene or paper core wire or similar, is drawn, as already mentioned before, through the dividing means 3 into the support and guide means 4 and 5 and therefrom through the twisting means 6 into pressing means 7, preferably a nipple having in the feeding direction of wires 2 a conically tapering opening in which the SZ-twisted wires 2 and the possible core element 9 are pressed tightly against each other to form an alternate reversely twisted product 8 which can further be bound by a suitable spinning device (not shown in the accompanying drawing) to eliminate the danger of untwisting.

Both the dividing means 3 and the twisting means 6 are composed preferably of a perforated holeplate, or the like both including;

a central opening for the central pipe 7 and the possible core element 9 to be drawn through it, and several circumferentially spaced and radially spaced openings with equally arranged distances from each other and radially spaced from said central opening for the peripherical pipes 4 and wires 2 to be drawn therethrough.

In the SZ-twisting apparatus according to the first and second advantageous embodiment of the present invention shown in FIGS. 1 and 4 the fixed holeplate 3 for dividing wires 2 and the possible core element 9 is stationarily fastened to a first support structure of the SZ-twisting apparatus. The perforated twisting holeplate at the output end of the wires 2 and the possible core element 9 is mounted in bearings carried by a second support structure of the SZ-twisting apparatus and is provided with its own rotation drive unnumbered, but shown with a curved arrow, preferably composed of an electric motor with a chain, gear or belt transmission, whereby the oscillating rotational speed regulation and reversing can automatically be realized in a simple manner.

Figure 2:
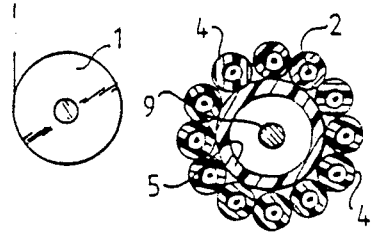
FIG. 2 is a cross-sectional view of means according to one advantageous embodiment for defining the feedpaths of elongated elements to be passed through the SZ-twisting apparatus, whereby said means are adapted between the dividing and twisting means.

To achieve the goal of the invention the support and guide means 4 and 5, which define the feedpaths for wires 2 and for the possible core element 9, are composed of a pipe group shown in FIG. 2, whereby the pipe group includes a central pipe 5, through which is drawn the possible core element 9 of the product to be manufactured, and several peripherally arranged peripheral pipes 4 about the central pipe 5. Wires 2 are drawn through the twistable peripheral pipes 4 to be twisted.

In the SZ-twisting apparatus according to the invention said peripheral pipes 4 are thin, with a diameter between 5 to 20 mm preferably about 10 mm, and are resilient and being made of torsion-elastic material, preferably of polyamide or polytetrafluorethylene and fixed into the circumferentially arranged openings of both the dividing holeplate or holedisk and the twisting holeplate or holedisk, whereby the peripheral pipes 4 form a pipe mantle around the central pipe 5. According to one preferred embodiment of the invention shown in FIG. 2 the peripheral pipes 4 are arranged side by side close to each other, so that the pipe mantle formed by individual peripheral pipes 4 extends essentially uniformly around the central pipe 5. When the peripheral pipes 4 are made of e.g. polytetrafluorethylene, there is obtained also the advantage that sliding friction between the peripheral pipe 4 and wire 2 is extremely low which tends to facilitate the easy passing of wires 2 inside the peripheral pipe 4.

During the twisting phase of the wires 2 the peripheral pipes 4 are wound around the periphery of the central pipe 5 as a result of the rotational movement of the twisting holeplate 6. In order to compensate for the growing tensile stress caused by the twisting the ends of the peripheral pipes 4, the pipes 4 have been in the advantageous embodiment of the present invention fixed in their axial direction resiliently into the circumferentially existing openings in the dividing holeplate 3. Corresponding resilient connection can also be used in the end of twisting holeplate 6 which is provided with circumferential openings of the same type. If the SZ-twisting apparatus is used for rapid twisting of thin wires, like e.g. electric leads or optical fibers, it is preferable to bind the peripheral pipes 4 elastically to each other, whereby the harmful effect caused of centrifugal forces can be totally eliminated. This can most simply be made e.g. by adapting an elastic connecting ring (not shown) around the peripheral pipes or by connecting the peripheral pipes already in their manufacturing phase together e.g. by elastic strip portions.

Because the wires 2 to be twisted pass inside the peripheral pipes 4 they are not in contact with the central pipe 5, whereby the rotating central pipe does not either cause friction impeding the drawing of wires or generate any jamming danger.

Figure 5:
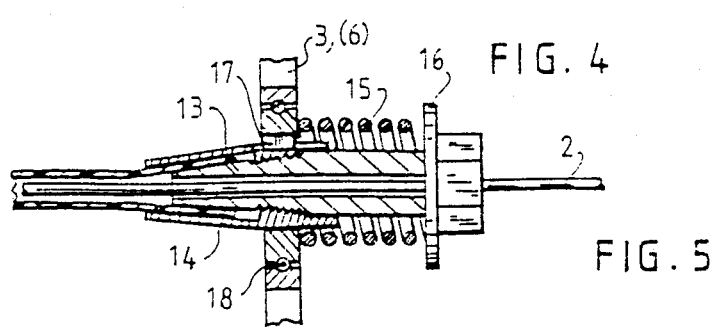
FIG. 5 is a cross-section of an advantageous fastening arrangement of a peripherical pipe adapted into one opening of the dividing and/or twisting means.

To obtain at least 10 or even 100, preferably between 30 to 80 turns as used with good results in test carried out, twisting turns of the peripheral pipes 4 into one direction around the central pipe 5 each torsion-elastic peripheral pipe 4 is fastened according to the preferred embodiment of the present invention shown in FIG. 5 into the circumferentially existing openings or borings of the perforated dividing holeplate 3 and/or into the circumferentially existing openings or borings of the perforated twisting holeplate 6 (which, however is not shown in FIGS. 1 or 3), resiliently in the axial direction of its longitudinal axis both rotatably around its longitudinal axis. Due to the rotatable attachment twisting of each peripheral pipe 4 around the central pipe 5 does not cause a torsional load to the peripheral pipe 4 and due to the resilient attachment also, the generating tensile load can be kept as small as possible. This kind of attachment can be obtained e.g. in such a way, that each peripheral pipe 4 is compressedly locked between conical countersurfaces of two compression locking pieces 13 and 14, whereby the outer locking piece 14 is mounted with bearings into the opening of the perforated dividing holeplate 3 (or twisting holeplate 6) to rotate around and to move axially in relation to the longitudinal axis of the peripheral pipe 4. The locking can be made e.g. by a wedge means 17 locking the outer piece 14 and the bearing 18. To achieve resiliency one of the locking pieces 13 or 14 (in FIG. 5 that is the inner locking piece 13) is provided with flange 16, whereby between said flange 16 and the perforated disk 3 (or 6), there is arranged resilient means 15 for example a coil spring as shown in FIG. 5, rotating with the peripheral pipes and collapsing when the peripheral pipes 4 are wounding around the central pipe 5, whereby too high a tension of the peripheral pipes 4 can be prevented.

To achieve the goal of the invention the central pipe 5 may comprise a rigid, preferably prestressed and rotating metal pipe arranged onto support structures or a torsion-elastic torsion pipe made e.g. of plastic-based material, preferably of polyamide, and arranged onto support structures.

In the embodiment shown in FIG. 1 the central pipe 5 is made of polyamide. It must be emphasized that the central pipe 5 can in this embodiment also be made of metal, e.g. steel. In this embodiment the central pipe 5 is prestressed between a first and a second support structure, whereby the disadvantages due to sag and centrifugal forces can be eliminated.

As shown in FIG. 1 the end of the central pipe 5 towards the input side of wires to be twisted is adapted into the central opening or boring of the perforated dividing holeplate 3 and is provided with a bearing arrangement 11 resisting axial load, e.g. thrust or ball bearing. To ensure the axial immobility of the central pipe 5 the outer surface of the central pipe 5 is provided with a radially extending support flange supported against the above mentioned bearing 11. As further shown in FIG. 1 the end of the central pipe 5 towards the output side of wires 2 to twisted has been rigidly fastened into the central opening or boring of the perforated twisting holeplate 6. This opening is preferably conical, in which case the central pipe 5 is compressedly locked at its outer surface by a locking piece corresponding to the inner surface of said conical opening or boring. In this embodiment the rotating movements of the central pipe 5 as well as the oscillating twisting movements of the peripheral pipes 4 to opposite directions thus are achieved by means of the alternate reversely rotating twisting holeplate 6.

When the central pipe 4 is made torsion-elastic it is preferable to provide that end of the central pipe 5 towards the dividing holeplate 3 with its own rotation drive to adjust the twisting rate of the central pipe 4, whereby it is possible to increase the effective length on which the wires 2 are wound inside the peripheral pipes 5 around the central pipe further it is possible with this kind of an arrangement to decrease both the accumulation tendency and the angular deviation at the end of the central pipe towards the twisting holeplate 6.

In the embodiment shown in FIG. 4 the central pipe 4 is made of metal, e.g. steel, and prestressed between first and second support structures (not shown). Whereby the disadvantages caused by sag and centrifugal forces can be minimized. Naturally the central pipe 4 can in this second embodiment be also made of plastic based material, e.g. polyamide.

According to this second embodiment shown in FIG. 4 the central pipe 5 is adapted centrally both to stationary dividing holeplate 3 and to alternate reversely rotating twisting holeplate 6 and mounted to rotate essentially freely and untwistingly in relation to both dividing and twisting holeplates. In this embodiment the central pipe 5 is supported at its both ends with bearings 11 and 12, preferably thrust- or ball-type bearings resisting axial load. The axial immobility of the central pipe 5 can in this embodiment be ensured for example by providing the outer surface of the central pipe 5 with radially extending flanges, one of which is to support the bearing 11 at the side of the dividing holeplate 3, and the other of which is supported by the bearing 12 at the side of the twisting holeplate 6. As further can be seen in FIG. 4 that the end of the central pipe 5 towards the dividing holeplate 3 is provided with a rotating drive, which can be e.g. an electric motor with a chain, belt, gear or similar force transmission mechanism. Due to the freely, in relation to the rotational movements of the twisting holeplate 6, adjustable oscillating rotational speed as well as direction of the central pipe 5 is achieved with the advantage, that the central pipe 5 being rotatably oscillating with different speeds or even directions compared with the oscillating rotational movements of the twisting holeplate 6 and peripheral pipes 4, whereby it is possible to reduce friction between central pipe 5 and peripheral pipes 4 and spread the wounding of peripheral pipes 4 onto a longer portion of the surface of the central pipe 5. An arrangement according to this second preferred embodiment evens out the pitch of the peripheral pipes 4 wound around the central pipe 5 particularly at that end of the central pipe towards the twisting holeplate 6 or reduces the so-called pitch error.

Figure 3:
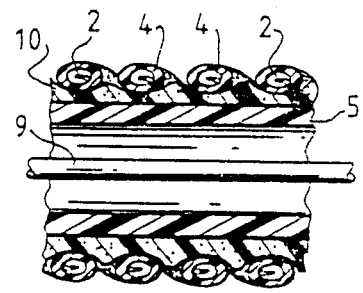
FIG. 3 is a longitudinal cross-section of means according to another advantageous embodiment for defining the feedpaths of elongated elements to be passed through the SZ-twisting apparatus, whereby said means are adapted between the driving and twisting means.

On the one hand, to prevent flattening of the peripheral pipes 4 wound around the central pipe 5, which may impede movements of the wires 2 through the peripheral pipes 4, and on the other hand to eliminate sliding of the peripheral pipes 4 axially on the surface of the central pipe 5, which may increase jamming probability, pitch error and the accumulation of the peripheral pipes 4 especially at the side of twisting holeplate 6, the outer perimeter of the central pipe 5 is provided as shown in FIG. 3 with a resilient material layer 10, which according to one preferred embodiment of the invention is made of polyurethane and to which the peripheral pipes 4 are pressed during wounding around the central pipe 5.

When an SZ-twisted product is manufactured by the SZ-twisting apparatus according to the present invention, which product should include a central core element 9 and SZ-twisted peripheral wires 2 surrounding peripherially the core element 9, then the core element 9 extends to the whole length of the product to be manufactured, and it is drawn through the central pipe 5 into the nipple 7 simultaneously when the wires 2 to be twisted are drawn through the peripheral pipes 4 to be wound around the central pipe 5 into the mouthpiece 7.

When the inner diameter of the central pipe 5 is selected essentially greater than the diameter of the core element 9 to be drawn therethrough, the core element 9 can be coated before entering the twisting holeplate 6, and preferably before the dividing holeplate 3, with an intermediate, e.g. insulation or binding agent, or layer. When said binding agent layer is used, the above mentioned binding after the nipple 7 by means of a thread or band for ensuring the twisting maintenance can be eliminated and the twisted wires 2 are fastened keeping their pitch in the nipple to said binding agent or layer 10.

The invention has been above described only by means of some preferred embodiments. This is not, however, meant to limit the present invention, but several modifications as well as variations are possible within the spirit and scope of the accompanying claims.

Thus the afore-described bearing and rotating solutions for the central pipe 5 are not naturally the only ones to achieve the goal of the present invention.

When the central pipe 5 is composed of a torsion-elastic torsion pipe it must be observed, that the bearing arrangement of the central pipe 5 at the end of the dividing holeplate 3 described in connection with the FIG. 1 is not necessary. The central pipe 5 can be adapted between the first and second support structures so that it is stationary and centrally fastened at its one end to the dividing holeplate 3 and at its other end also stationary and centrally to the twisting holeplate 6, whereby the central pipe 5 is twisted periodically to opposite directions corresponding to the oscillating rotational movement of the twisting holeplate 6.

When the central pipe has been made as a torsion pipe, its end towards the dividing holeplate 3 is adapted in the bearing arrangement, preferably resisting axial load, and provided with a rotation drive, as an electric motor with suitable power transmission. The other end of the central pipe can then be fastened centrally and in a stationary manner to the twisting holeplate, whereby by changing the rotational speed or direction of that end of the central pipe towards dividing holeplate 3, the twisting of the central pipe around its longitudinal axis can be accelerated, retarded or held up.

In connection with the supporting of the central pipe 5 it must still be stated that in accordance with the present invention instead of the bearing arrangement resisting axial load it is possible to use a bearing arrangment enabling an axial movement of the central pipe in relation to the dividing means or twisting means. Such a bearing arrangement, by which the central pipe 5 can be adapted floatingly between the dividing and twisting means, can be realized by e.g. a sliding or closed bearing mounted at that end of the central pipe which has not been stationary fastened to the twisting means rotating the central pipe or at that end of the central pipe which is not connected with the rotating drive. Such a floating central pipe is not, of course, prestressed and it can therefore be used most advantageously in solutions where a large span between support structures are not required.

Further, it must be stated that the guide and support means, which define the feedpaths for the wires to twisted, are not necessarily composed of separate torsion-elastic pipes as described before, but they can also be constructed of a torsion-elastic and hollow multichannel profile element, which is manufactured e.g. by extrusion, and which includes one central channel for the possible core element and several hollow peripheral channels for the wires to be twisted surrounding the central channel.

The central pipe or central channel can also be equipped with spacers defining into the inner space of the central pipe or central channel with a desired number of parallel feedpaths for the core elements. In this case also an elongated core unit can be assembled by mutually twisted wire elements by twisting the central pipe simultaneously with the twisting of the peripheral pipes.

I claim:

1. An alternate reverse twisting method to form a cable-type product, comprising at least one inner core element (9) and alternate reversely twisted elongated elements (2) to be treated by twisting as quads of wires, by an alternate reverse twisting apparatus, comprising:
    applying the elements (2, 9) to fixed dividing means (3) at the input end of the elements (2, 9) to be treated;
    periodically rotating twisting means (6) in opposite directions at the output end of the treated elements (2, 9);
    pressing with pressure means (7) the treated elements (2, 9) tightly against each other; and defining feedpaths for the elements (2, 9) to be treated concentrically between the dividing means (3) and twisting means (6) and supported by first and second means (4, 5);
    drawing the elongate elements (2) to be twisted from said dividing means (3) to said pressing means (7) inside said first means composed of torsion-elastic peripheral pipes (4), which are bound side by side in close vicinity to each other to form an essentially uniform pipe mantle around said second means comprising an oscillating rotatable and/or twistable central pipe (5), which is supported by both said dividing means (3) and twisting means (6), so that said elongate elements (2) are adapted to pass through said peripheral pipes (4) which are twisted periodically into one direction at least 10 turns around and against said central pipe (5).

2. The method according to claim 1; including
    drawing a core element (9) from said dividing means (3) to said pressing means (7) through said central pipe (5); and
    coating the core element (9) before it enters into said pressing means (7), the inner diameter of said central pipe (5) being essentially greater than the diameter of said core element.

3. The method according to claim 1; including
    using the central (5) pipe as an essentially rigid pipe which is fixed centrally to the twisting means (6) and mounted in bearings, which are adapted centrally in the dividing means (3) whereby said central pipe is rotated with said twisting means.

4. The method according to claim 1, wherein the central pipe (5) is used as a pipe, both ends of which are in bearings; and
    providing at least one end of the central pipe with a rotation drive so that the rotation speed and rotation direction are adjusted in relation to the twisting means by means of the rotation drive.

5. The method according to claim 4; including
    rotating said central pipe (5) by means of said rotation drive with a different speed and/or direction in relation to the speed and/or direction of said twisting means to decrease friction between said central pipe during the twisting of said peripheral pipes (4) by means of said twisting means (6); and
    said peripheral pipes have a tendency to accumulate with denser pitch at the end of said central pipe towards said twisting means as well as to increase twisting turns around said central pipe in one direction.

6. The method according to claim 1; including using said central pipe (5) as a torsion-elastic and preferably prestressed pipe, one end being fixed solidly and centrally to said twisting means (6), and the other end being in bearings centrally at the dividing means (3); and providing the other end of said central pipe with a rotation drive whereby oscillating rotation and twisting speed and/or oscillating rotation and twisting direction are adjusted in relation to said twisting means by means of said rotation drive.

7. The method according to claim 1;

wherein said peripheral pipes (4) are torsion-elastic pipes made of a material such as polyamide or polytetrafluorethylene, and including connecting one end of each circumferentially to the dividing means (3) and connecting the other end of each circumferentially to said twisting means (6); and wherein the oscillating twisting rate and direction periodically in opposite directions around said central pipe (5) are defined by the rotation movement of said twisting means (6).

8. An alternate reverse twisting apparatus to form a cable product comprising at least one inner core element (9) and alternate reversely twisted elongated elements (2) to be treated by twisting as quads of wires, said apparatus comprising:

fixed dividing means (3) at the input end of the elements (2, 9) to be treated;

rotating twisting means (6) at the output end of the treated elements (2, 9) to rotate the treated elements periodically in opposite directions;

pressing means (7) for pressing said treated elements (2, 9) tightly against each other;

first and second means (4, 5) for defining feedpaths for said elements (2, 9) to be treated, and means supporting said first and second means concentrically between said dividing and twisting means (3, 6);

said first and second means for defining the feedpaths being support and guide pipes (4, 5) for said elements (2, 9) to be treated and include:

an oscillating central pipe (5) supported by both said twisting means (6) and said dividing means (3);

torsion-elastic peripheral pipes (4), one end of each of said peripheral pipes being supported by said dividing means (3) and the other end of each of said peripheral pipes being supported by said twisting means (6) for periodically twisting in opposite directions, and said peripheral pipes being elastically joined side by side in close vicinity to each other to form an essentially uniform pipe mantle around said central pipe (5) and during each twisting stage of said peripheral pipes, first into one direction and then into the opposite direction being side by side against the periphery of said central pipe (5); and means passing each of said at least one inner core element (9) to be twisted between said dividing means (3) and said twisting means (6) individually through said central pipe (5).

9. The apparatus according to claim 8; including means fixing one end of said central pipe (5) centrally and solidly to said twisting means (6) to rotate therewith; and bearing means mounting the other end of said central pipe centrally to said dividing means (3) to rotate in relation to said dividing means.

10. The apparatus according to claim 9, wherein the inner diameter of said central pipe (5) is greater than the inner diameter of said peripheral pipes (4).

11. The apparatus according to claim 8; including means fixing one end of said torsion pipe centrally and solidly to said twisting means (6) to rotate with it, said central pipe (5) is a torsion-elastic and prestressed torsion pipe; and means mounting the other end of said torsion pipe centrally by means of bearings to said dividing means and being provided with its own rotation drive to adjust oscillating rotation and twisting speed as well as direction in relation to said twisting means (6).

12. The apparatus according to claim 8, wherein said central pipe (5) is an essentially rigid and preferably prestressed pipe; and both ends of said central pipe being mounted centrally by bearings means, one end to said dividing means (3) and the other end to said twisting means (6), and at least that end of said central pipe towards said dividing means being provided with a rotation drive to rotate said central pipe independently in relation to said twisting means.

13. The apparatus according to claim 8, wherein said central pipe (5) is coated with a resilient material layer, made of polyurethane, to which said peripheral pipes (4) are pressed during the twisting phase.

14. The apparatus according to claim 8, wherein to compensate the tensile load caused by the twisting of said peripheral pipes (4) each of said peripheral pipes includes resilient means (15) for connecting the peripheral pipe in the direction of its own longitudinal axis flexibly to at least one of said dividing means (3) and said twisting means (6), and to minimize the torsional load caused by the twisting of said peripheral pipes, each of said peripheral pipes is connected to said dividing means and/or to said twisting means rotably around its own longitudinal axis, so that said resilient means (15) for each of said peripheral pipes is adapted to rotate with said peripheral pipes in relation to the openings of at least one of said dividing means and twisting means.

15. The apparatus according to claim 8, wherein the length of both said central pipe (5) and said peripheral pipes (4) is between 5 to 30 meters.

16. The apparatus of claim 8, wherein the length of said central pipe (5) and said peripheral pipes each is between 10 to 20 meters.

17. The apparatus according to claim 8, wherein said peripheral pipe mantle composed of said peripheral pipes (4) is bound elastically by means of adapting at least one elastic connecting ring around said pipe mantle.

18. The apparatus of claim 8, wherein the peripheral pipes (4) are bound by means joining adjacent peripheral pipes together.

19. The apparatus according to claim 8, including:

means passing each said elongated element (2) to be twisted between said dividing means (3) and said twisting means (6) individually through one of said peripheral pipes.

* * * * *